US010852138B2

(12) United States Patent
Iyer et al.

(10) Patent No.: US 10,852,138 B2
(45) Date of Patent: Dec. 1, 2020

(54) SCALABALE SIMULTANEOUS LOCALIZATION AND MAPPING (SLAM) IN VIRTUAL, AUGMENTED, AND MIXED REALITY (XR) APPLICATIONS

(71) Applicant: Dell Products, L.P., Round Rock, TX (US)

(72) Inventors: Vivek Viswanathan Iyer, Austin, TX (US); Ryan Nicholas Comer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 296 days.

(21) Appl. No.: 16/008,727

(22) Filed: Jun. 14, 2018

(65) Prior Publication Data

US 2019/0383615 A1 Dec. 19, 2019

(51) Int. Cl.
| | |
|---|---|
| *G06K 9/00* | (2006.01) |
| *G01C 21/00* | (2006.01) |
| *G02B 27/01* | (2006.01) |
| *G06T 19/00* | (2011.01) |
| *G06F 16/29* | (2019.01) |

(52) U.S. Cl.
CPC ......... *G01C 21/005* (2013.01); *G02B 27/017* (2013.01); *G06F 16/29* (2019.01); *G06T 19/006* (2013.01)

(58) Field of Classification Search
CPC .............................. G01C 21/005; G06F 16/29
See application file for complete search history.

(56) References Cited

U.S. PATENT DOCUMENTS

| | | | | |
|---|---|---|---|---|
| 2006/0047416 A1* | 3/2006 | Goldberg | ............... | G01C 21/34 701/438 |
| 2015/0228077 A1* | 8/2015 | Menashe | .................. | G06K 9/52 382/103 |
| 2015/0304634 A1* | 10/2015 | Karvounis | ......... | G06K 9/00201 348/46 |
| 2017/0010115 A1* | 1/2017 | Stein | ...................... | B60W 30/14 |
| 2018/0164877 A1* | 6/2018 | Miller | .................. | H04B 1/3827 |

OTHER PUBLICATIONS

Riisgaard, et al., "SLAM for Dummies", 127 pages, Extended KalmanFilters for SLAM, available at https://ocw.mit.edu/courses/aeronautics-and-astronautics/16-412j-cognitive-robotics-spring-2005/projects/1aslam_blas_repo.pdf.

(Continued)

*Primary Examiner* — Jess Whittington
(74) *Attorney, Agent, or Firm* — Fogarty LLP

(57) ABSTRACT

Systems and methods for scalable Simultaneous Localization and Mapping (SLAM) in virtual, augmented, and mixed reality (xR) applications are described. In some embodiments, an Information Handling System (IHS) may include: a host processor; and a memory coupled to the host processor, the memory having program instructions stored thereon that, upon execution, cause the IHS to: select a subset of landmarks comprising fewer than all landmarks detected in a physical environment; and manage utilization of an IHS resource during execution of a virtual, augmented, or mixed reality application using the subset of landmarks to the exclusion of other landmarks.

14 Claims, 9 Drawing Sheets

(56) References Cited

OTHER PUBLICATIONS

Sola, et al., "Simulataneous localization and mapping with the extended Kalman fiter", Oct. 5, 2014, 35 pages, available at http://www.iri.upc.edu/people/jsola/JoanSola/objectes/curs_SLAM/SLAM2D/SLAM%20course.pdf.
Zia, et al., "Comparative Design Space Exploration of Dense and Semi-Dense SLAM", arXiv:1509.04648v3 [cs.RO], Mar. 3, 2016, 9 pages, available at https://arxiv.org/pdf/1509.04648.pdf.
Tang, et al., "Embedded Systems Architecture for SLAM Applications", 4 pages, available at https://arxiv.org/ftp/arxiv/papers/1702/1702.01295.pdf.

* cited by examiner

SCALABALE SIMULTANEOUS LOCALIZATION AND MAPPING (SLAM) IN VIRTUAL, AUGMENTED, AND MIXED REALITY (XR) APPLICATIONS

FIELD

The present disclosure generally relates to Information Handling Systems (IHSs), and, more particularly, to systems and methods for scalable Simultaneous Localization and Mapping (SLAM) in virtual, augmented, and mixed reality (xR) applications.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In modern applications, IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible.

In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In modern implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for scalable Simultaneous Localization and Mapping (SLAM) in virtual, augmented, and mixed reality (xR) applications are described. In an illustrative, non-limiting embodiment, an Information Handling System (IHS) may include: a host processor; and a memory coupled to the host processor, the memory having program instructions stored thereon that, upon execution, cause the IHS to: select a subset of landmarks comprising fewer than all landmarks detected in a physical environment and manage utilization of an IHS resource during execution of a virtual, augmented, or mixed reality application using the subset of landmarks to the exclusion of other landmarks. For example, the IHS resource may include a host processor and/or a memory.

Landmarks may be detected via an HMD in communications with the IHS. Particularly, the subset of landmarks may be usable during execution of the xR application to locate the HMD in the physical environment. In some implementations, to select the subset of landmarks, the program instructions, upon execution, may further cause the IHS to rank a plurality of landmarks using a confidence level associated with each landmark. And the confidence level may be a Kalman Gain.

The subset of landmarks may include a number of landmarks selected to maintain the utilization of the IHS resource below a predetermined amount. In some cases, the number of landmarks may be selected based upon a calibration curve that associates a reduction in number of used landmarks with a corresponding reduction in utilization of the IHS resource. Alternatively, the number of landmarks may be selected based upon a calibration curve that associates a change in number of used landmarks with a corresponding change in utilization of the IHS resource.

The program instructions, upon execution, may cause the IHS to identify an increase in the utilization of the IHS resource and reduce the number of landmarks in the subset of landmarks to avoid reaching a maximum IHS resource utilization level. Alternatively, the program instructions, upon execution, may cause the IHS to identify a decrease in the utilization of the IHS resource and increase the number of landmarks in the subset of landmarks without reaching the maximum IHS resource utilization level.

In another illustrative, non-limiting embodiment, a method may include selecting a subset of landmarks usable by a SLAM system to locate an HMD in an environment, where subset of landmarks includes a number of landmarks fewer than all detected landmarks; and controlling utilization of a hardware resource by changing the landmarks in the subset.

The method may further include ranking the detected landmarks using a confidence level associated with each landmark. For instance, the number of landmarks may be selected based upon a calibration curve that associates a reduction in number of landmarks with a corresponding increase in availability of the IHS resource. Alternatively, the number of landmarks may be selected based upon a calibration curve that associates an increase in number of landmarks with a corresponding reduction in availability of the IHS resource.

In yet another illustrative, non-limiting embodiment, a hardware memory device may have program instructions stored thereon that, upon execution by a hardware processor, cause the hardware processor to: select a subset of landmarks usable to locate an HMD in space, where the subset of landmarks includes fewer than a total number of landmarks available, and control utilization of the hardware processor by dynamically changing a number of landmarks in the subset during execution of an xR application.

To select the subset of landmarks, the program instructions, upon execution, may cause the hardware processor to rank each of the landmarks detected by the HMD using a confidence level associated with each landmark. For instance, the program instructions, upon execution, may cause the hardware processor to identify an increase in the utilization of the hardware processor and reduce the number of landmarks in the subset of landmarks. Alternatively, the program instructions, upon execution, may cause the hardware processor to identify a decrease in the utilization of the hardware processor and increase the number of landmarks in the subset of landmarks.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for scalable Simultaneous Localization and Mapping (SLAM) in virtual, augmented, and mixed reality (xR) applications. These techniques are particularly useful in xR applications that employ head-mounted devices (HMDs), Heads-Up Displays (HUDs), and eyeglasses—collectively referred to as "HMDs."

As used herein, the term SLAM refers systems and methods that use positional tracking devices to construct a map of an unknown environment where an HMD is located, and that simultaneously identifies where the HMD is located, its orientation, and/or pose.

Generally, SLAM methods implemented in connection with xR applications may include a propagation component, a feature extraction component, a mapping component, and an update component. The propagation component may receive angular velocity and accelerometer data from an Inertial Measurement Unit (IMU) built into the HMD, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as the HMD moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

Figure 1:
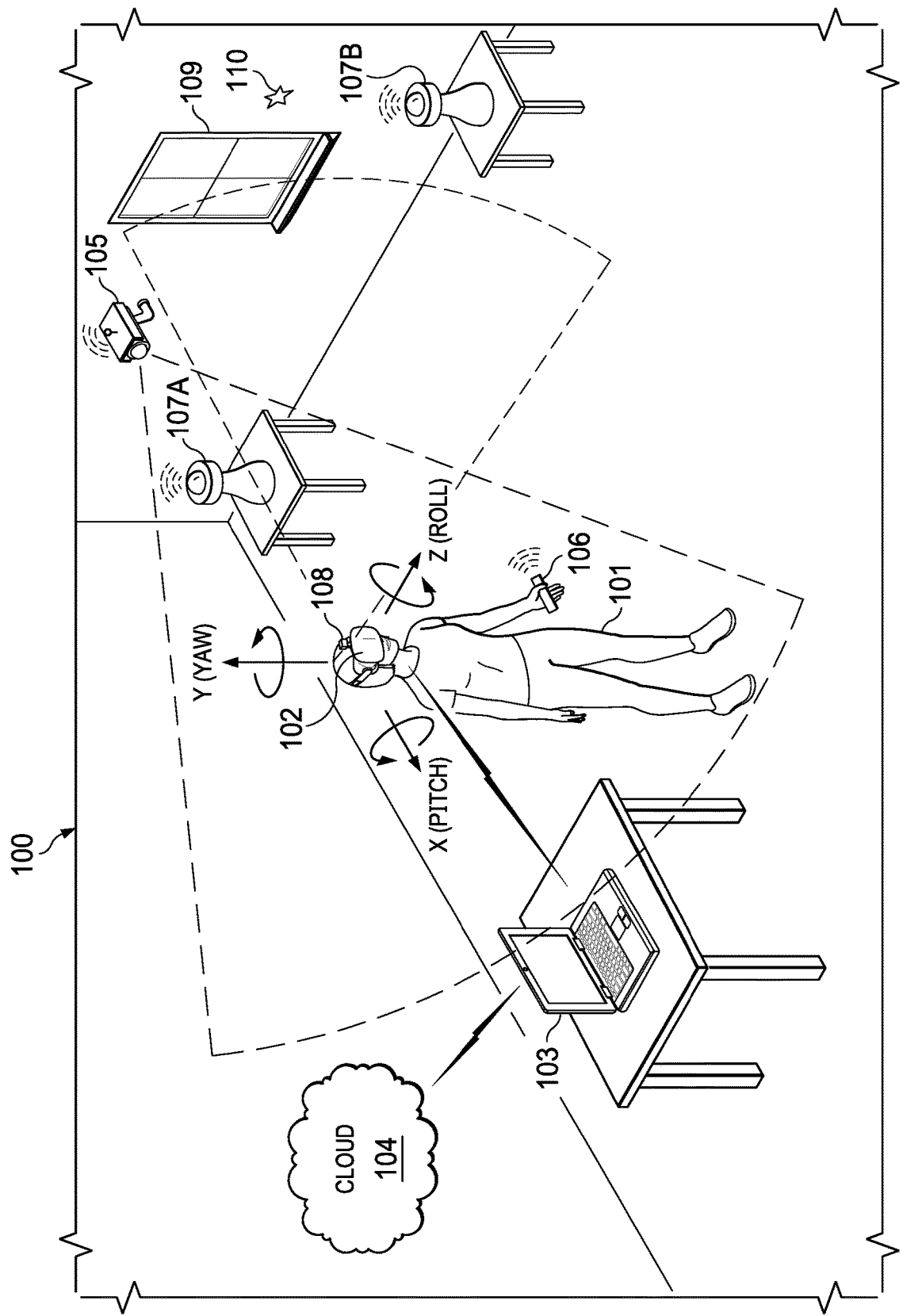
FIG. 1 is a perspective view of an example of an environment having a plurality of disparate positional tracking components usable by a Simultaneous Localization and Mapping (SLAM) system, according to some embodiments.
Figure 3:
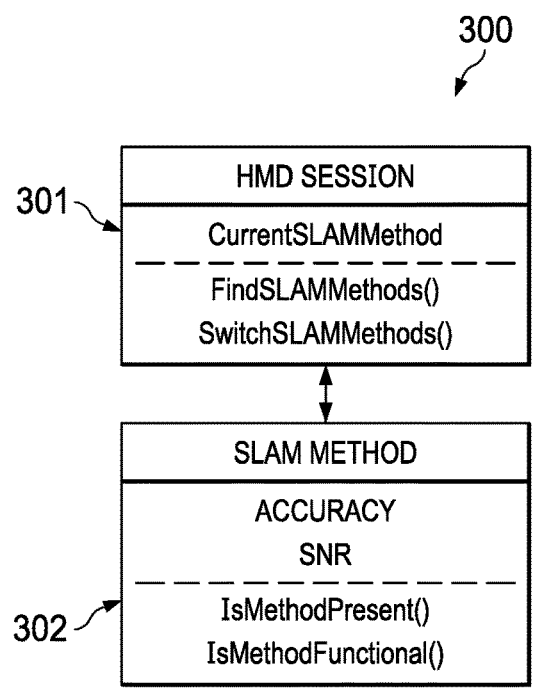
FIG. 3 is a block diagram of examples of objects usable to implement techniques for SLAM switching, according to some embodiments.

FIG. 1 is a perspective view of an example of physical environment 100 having a plurality of disparate positional tracking components usable by a SLAM method. In various embodiments, user 101 may wear HMD 102 around their heads and over their eyes, during execution of an xR application. An xR application may include a subset of components or objects executed by HMD 102 and another subset of components or objects executed by Information Handling System (IHS) 103, as shown in FIG. 3.

HMD 102 may be tethered to host IHS 103 via a wired or wireless connection. Particularly, host IHS 103 may be used to generate digital images to be displayed by HMD 102. HMD 102 transmits information to host IHS 103 regarding the state of user 101 (e.g., physical position, head orientation, gaze focus, etc.), which in turn enables host IHS 103 to determine which image or frame to show to the user next, and from which perspective.

For instance, as user 101 moves about environment 100, any change in: (i) physical location (e.g., x, y, and z) or translation; or (ii) orientation (e.g., pitch, yaw, and roll) or rotation, may cause host IHS 103 to effect a corresponding change in the picture or symbols displayed to user 101 via HMD 102. These changes may be detected by HMD 102 and processed by host IHS 103, for example, to maintain congruence with the outside world and/or to allow user 101 to look around a consistent virtual reality environment.

To enable positional tracking for SLAM purposes, HMD 102 may use wireless, inertial, acoustic, or optical sensors. And, in many embodiments, each different SLAM method may use a different positional tracking source or device. For example, wireless tracking may use a set of anchors or lighthouses 107A-B that are placed around the perimeter of environment 100 and/or one or more tokens 106 or tags 110 that are tracked; such that HMD 102 triangulates its position and/or state using those elements. Inertial tracking may use data from accelerometers and gyroscopes within HMD 102 to find a velocity and position of HMD 102 relative to some initial point. Acoustic tracking may use ultrasonic sensors to determine the position of HMD 102 by measuring time-of-arrival and/or phase coherence of transmitted and receive sound waves.

Optical tracking may include any suitable computer vision algorithm and tracking device, such as a camera of visible, infrared (IR), or near-IR (NIR) range, a stereo camera, and/or a depth camera. With inside-out tracking using markers, for example, camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In others cases, markerless inside-out tracking may use continuous searches and feature extraction techniques from video frames obtained by camera 108 (e.g., using visual odometry) to find natural visual landmarks (e.g., window 109) in environment 100.

In various embodiments, data obtained from a positional tracking system and technique employed by HMD 102 may be received by host IHS 103, which in turn executes the SLAM method of an xR application. In the case of an inside-out SLAM method, for example, an xR application receives the position and orientation information from HMD 102, determines the position of features extracted from the images captured by camera 108, and corrects the localization of landmarks in space using comparisons and predictions.

An estimator, such as an Extended Kalman filter (EKF) or the like, may be used for handling the propagation component of an inside-out SLAM method. In some cases, a map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100 may be obtained, at least in part, from cloud 104.

Figure 2:
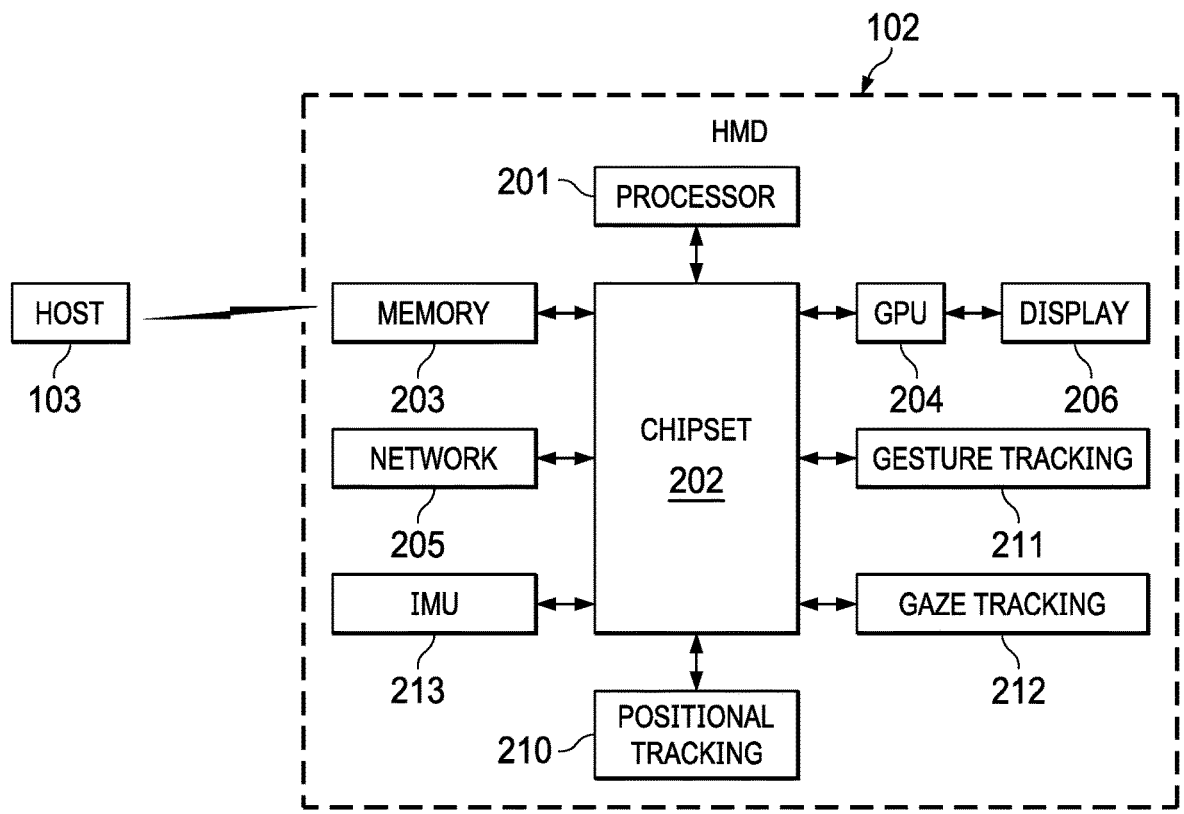
FIG. 2 is a block diagram of an example of a Head-Mounted Display (HMD) and a host Information Handling System (IHS), according to some embodiments.

FIG. 2 is a block diagram of an example HMD 102 and host IHS 103, according to some embodiments. As depicted, HMD 102 includes components configured to display an all-immersive virtual environment and/or to overlay digitally-created content or images on a display, panel, or surface (e.g., an LCD panel, an OLED film, a projection surface, etc.), in place of and/or in addition to the user's natural visual perception of the real-world.

As shown, HMD 102 includes processor 201. In various embodiments, HMD 102 may be a single-processor system, or a multi-processor system including two or more processors. Processor 201 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

HMD 102 includes chipset 202 coupled to processor 201. In certain embodiments, chipset 202 may utilize a Quick-Path Interconnect (QPI) bus to communicate with processor 201. In various embodiments, chipset 202 provides processor 201 with access to a number of resources. For example, chipset 202 may be coupled to network interface 205 to enable communications via various wired and/or wireless networks.

Chipset 202 may also be coupled to display controller or graphics processor (GPU) 204 via a graphics bus, such as an Accelerated Graphics Port (AGP) or Peripheral Component Interconnect Express (PCIe) bus. As shown, graphics processor 204 provides video or display signals to display 206.

Chipset 202 further provides processor 201 and/or GPU 204 with access to memory 203. In various embodiments, memory 203 may be implemented using any suitable memory technology, such as static RAM (SRAM), dynamic RAM (DRAM) or magnetic disks, or any nonvolatile/Flash-type memory, such as a solid-state drive (SSD) or the like. Memory 203 may store program instructions that, upon execution by processor 201 and/or GPU 204, present an xR application to user 101 wearing HMD 102.

Other resources coupled to processor 201 through chipset 202 may include, but are not limited to: positional tracking system 210, gesture tracking system 211, gaze tracking system 212, and inertial measurement unit (IMU) system 213.

Positional tracking system 210 may include one or more optical sensors (e.g., a camera 108) configured to determine how HMD 102 moves in relation to environment 100. For example, an inside-out tracking system 210 may be configured to implement tracking techniques that use distinctive visual characteristics of the physical environment to identify specific images or shapes which are then usable to calculate HMD 102's position and orientation.

Gesture tracking system 211 may include one or more cameras or optical sensors that enable user 101 to use their actual hands for interaction with objects rendered by HMD 102. For example, gesture tracking system 211 may be configured to implement hand tracking and gesture recognition in a 3D-space via a user-facing 2D camera. In some cases, gesture tracking system 211 may track a selectable number of degrees-of-freedom (DOF) of motion, with depth information, to recognize dynamic hand gestures (e.g., swipes, clicking, tapping, grab and release, etc.) usable to control or otherwise interact with xR applications executed by HMD 102.

Gaze tracking system 212 may include an inward-facing projector configured to create a pattern of infrared or (near-infrared) light on the user's eyes, and an inward-facing camera configured to take high-frame-rate images of the eyes and their reflection patterns; which are then used to calculate the user's eye's position and gaze point. In some cases, gaze detection or tracking system 212 may be configured to identify a direction, extent, and/or speed of movement of the user's eyes in real-time, during execution of an xR application.

IMU system 213 may include one or more accelerometers and gyroscopes configured to measure and report a specific force and/or angular rate of the user's head. In some cases, IMU system 212 may be configured to a detect a direction, extent, and/or speed of rotation (e.g., an angular speed) of the user's head in real-time, during execution of an xR application.

In some implementations, HMD 102 may communicate with host IHS 103 via wired or wireless connections (e.g., WiGig, WiFi, etc.). For example, if host IHS 103 has more processing power and/or better battery life than HMD 102, host IHS 103 may be used to offload some of the processing involved in the creation of the xR experience. In some cases, host IHS 103 may be built into (or otherwise coupled to) a backpack or vest, wearable by user 101.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

In various embodiments, HMD 102 and/or host IHS 103 may not include each of the components shown in FIG. 2. Additionally, or alternatively, HMD 102 and/or host IHS 103 may include components in addition to those shown in FIG. 2. Furthermore, components represented as discrete entities in FIG. 2 may, in some embodiments, be integrated with other components. In various implementations, all or a portion of the functionality provided by the illustrated components may be provided by components integrated as a System-On-Chip (SOC), or the like.

SLAM Switching

Within environment 100, there may be many disparate positional tracking sources concurrently available to HMD 102 at any given time. For example, lighthouses 107A-B are known to be accurate positional sources, but require that user 101 remain in the same the area where the lighthouses are placed. Conversely, inside-out computer vision and visual odometry SLAM is not bound to a single space, but their accuracy depends upon the absence of noisy backgrounds. To address these, and other issues, host IHS 103 may be configured to transition, switch, or swap between various SLAM methods that use disparate systems of positional tracking detected by HMD 102, and to dynamically select the most suitable SLAM method available in a given context.

In various embodiments, systems and methods described herein may be configured to monitor the available methods of positional tracking that are available for HMD 102 during a user session, and determine what SLAM method, sensors, or devices are the best choice for the user's current situation. This process may occur throughout the user session to ensure that HMD 102 is using the most accurate SLAM method at any given time.

When user 101 moves into a new environment that supports another SLAM method, HMD 102 may start monitoring the new positional tracking source, check the signal-to-noise ratio (SNR), and compare the accuracy of the new SLAM method to the accuracy of the current SLAM method. If the SNR of the new SLAM method is greater than a threshold, and the new SLAM method is more accurate than the current one, then the SLAM method may be switched using a soft handover technique or the like. This may happen when a new positional tracking source is detected or later when the SNR of new source becomes stronger due to user movement. Switching SLAM algorithms based on context can improve the user experience and enable content that requires accurate mapping.

In many cases, each SLAM method may be associated with a specific context. The context for a SLAM method may be used to determine if the SLAM method is available. For example, a SLAM method that uses outside-in tracking with NIR-camera-based lighthouses can only be used in a room where such lighthouses are available. For each context, an available SLAM method may be assigned a fixed accuracy value; but it may have a changing SNR.

In some implementations, identification of context may be performed by communicating with an Internet-of-Things (IoT) device or the like. For example, an IoT device may be set up in room 100 that is calibrated for lighthouse tracking. The IoT device may continuously check if the lighthouses are operational. When user 101 walks in and out of room 100, HMD 102 may send a Hypertext Transfer Protocol (HTTP) request to the IoT device to check if the lighthouses are available and functional.

The SNRs of available SLAM methods may be used to determine when to make the switch. In some cases, every available SLAM method maps environment 101, but only the primary (or currently active) SLAM method runs at full capacity, framerate, or bandwidth. This makes the latency of switching methods minimal, because secondary (or currently non-active) SLAM method(s) may run in the background at a lower capacity, framerate, or bandwidth.

Available SLAM methods may change over time. For example, user 101 may have HMD 102 that utilizes visual odometry for mapping unknown environments, but they may instead walk into a room that has lighthouses 107A-B set up. In this case, HMD 102 may identify the room as having lighthouses, check the SNR of the newly available method, determine if the new SLAM method is more accurate, and decide to switch positional tracking systems if the new SLAM method is more accurate than the current SLAM method. This process may happen periodically while user 101 is wearing HMD 102. If user 101 walks outside of room 100, HMD 102 detects the change and switches back to visual odometry SLAM.

Accordingly, systems and methods described herein may dynamically select between different positional tracking systems and accompanying SLAM methods based upon what systems are functional, available, and most accurate; while minimizing compute and bandwidth from monitoring multiple available positional tracking sources simultaneously. These techniques may therefore be useful, for example, in HMD implementations that are capable of using multiple types of positional tracking devices.

FIG. 3 is a block diagram of examples of objects 300 usable to implement techniques for SLAM switching. In various embodiments, HMD session object 301 may reside in a hardware memory within HMD 102, and SLAM method object 302 may reside in another memory within host IHS 103.

As shown, HMD session object 301 may store information about a current or primary SLAM method (CurrentSLAMMethod), and it may support operations for finding new SLAM methods (FindSLAMMethods( )) and for switching between different SLAM methods (SwitchSLAMMethods( ). Conversely, SLAM method object 302 may store information about an accuracy and SNR of a plurality of SLAM methods, and it may support operations for determining whether a SLAM method is present (IsMethodPresent( )) and for determining whether a SLAM method is operational (IsMethodFunctional( )).

During operation of an xR application, components of HMD session object 301 and SLAM method object 302 may be used in cooperation to effect various SLAM switching techniques, as described in more detail below.

Figure 4:
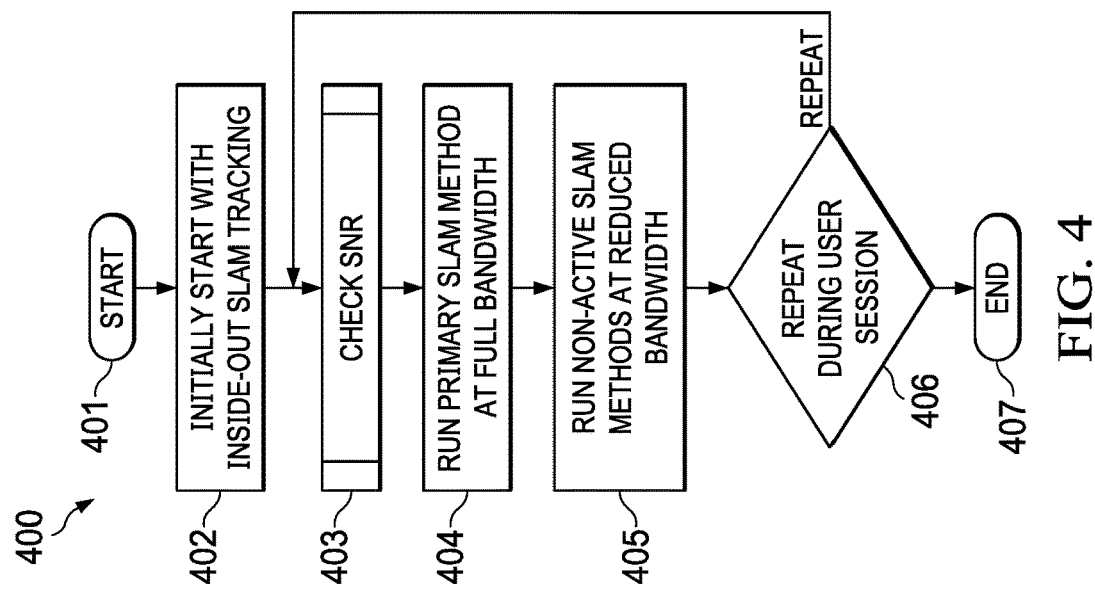
FIG. 4 is a flowchart of an example of a method for SLAM switching, according to some embodiments.

Particularly, FIG. 4 is a flowchart of an example of a method for SLAM switching, according to some embodiments. Method 400 starts at block 401. At block 402, method 400 initially begins operation of an xR application using an inside-out SLAM method. At block 403, method 400 checks the SNR of positional location sources usable by the SLAM method.

At block 404, method 400 runs a primary SLAM method at full capacity, sampling rate, or bandwidth (e.g., processing at least n frames of video per second). At block 405, method 400 runs one or more secondary (or non-active) SLAM method(s) at reduced capacity or bandwidth (e.g., processing fewer than n frames-per-second, often a small fraction of n). If the user session continues at block 406, control returns to block 403 and the SNR of another SLAM method is checked. Otherwise, method 400 ends at 407.

An example of a method for selecting of a primary SLAM method (block 404) and a secondary SLAM method (block 405) is described below in connection with FIG. 5. Particularly, method 500 starts at block 501. At block 502, method 500 measures the SNR for SLAM method M. At block 503, if the SNR is below a threshold value (e.g., in dB), control passes to block 504. At block 504, a new SLAM method M is selected, such that blocks 502-504 repeat until all available SLAM methods have been scanned and method 500 ends at block 505.

If the SNR of SLAM method M is above the selected threshold value, block 506 determines whether the accuracy of method M is greater than the accuracy of the currently used SLAM method (e.g., the initial inside-out SLAM method of block 402). If not, control passes to block 504. If so, block 507 makes method M the primary or active SLAM method, and the previously used method (e.g., of block 402) becomes a secondary or non-active SLAM method before method 500 ends at block 508.

Figure 6:
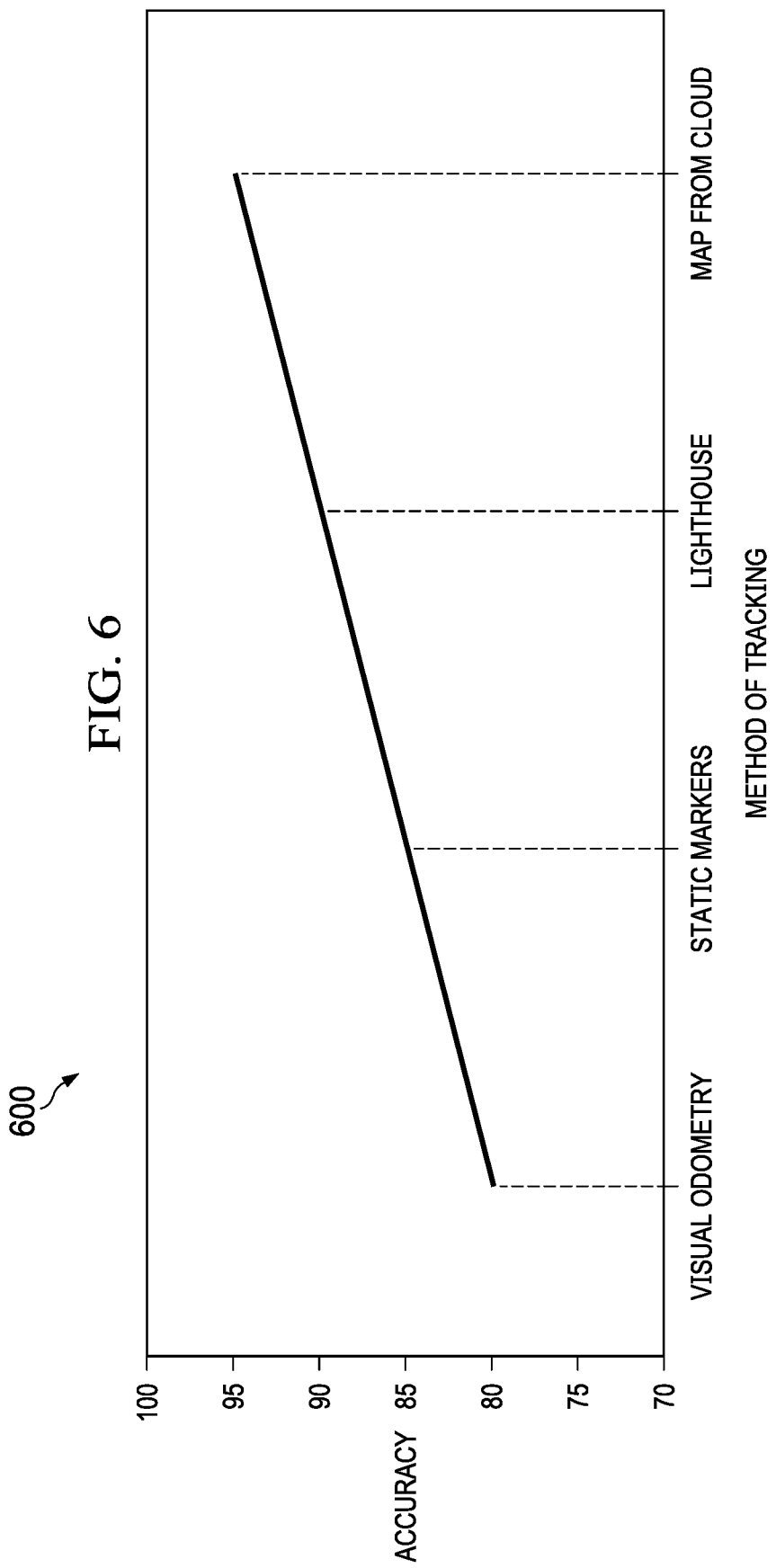
FIG. 6 is a graph showing an example of performance or accuracy comparisons between different SLAM methods, according to some embodiments.

FIG. 6 shows graph 600 of an example of performance or accuracy comparisons between different SLAM methods. In some embodiments, the benchmarking of different SLAM methods may be based upon a comparison of created maps. Additionally, or alternatively, comparisons between acquired poses and/or location of HMD 102, as produced by different positional tracking systems usable by different SLAM methods, may be used to determine accuracy or performance indicators.

In graph 600, the accuracies for methods of positional tracking that are available—in the case of environment 100, for example, inside-out visual odometry (109), static markers (110), lighthouses (107A-B), and map-from-could (104)—may be provided in the form a static n-dimensional curve or table, derived in advance. In this example, it has been determined that map-from-cloud enables a more accurate SLAM method than lighthouses, which in turn enable a more accurate SLAM method than static markers, and which in turn enable a more accurate SLAM method than visual odometry.

Figure 7:
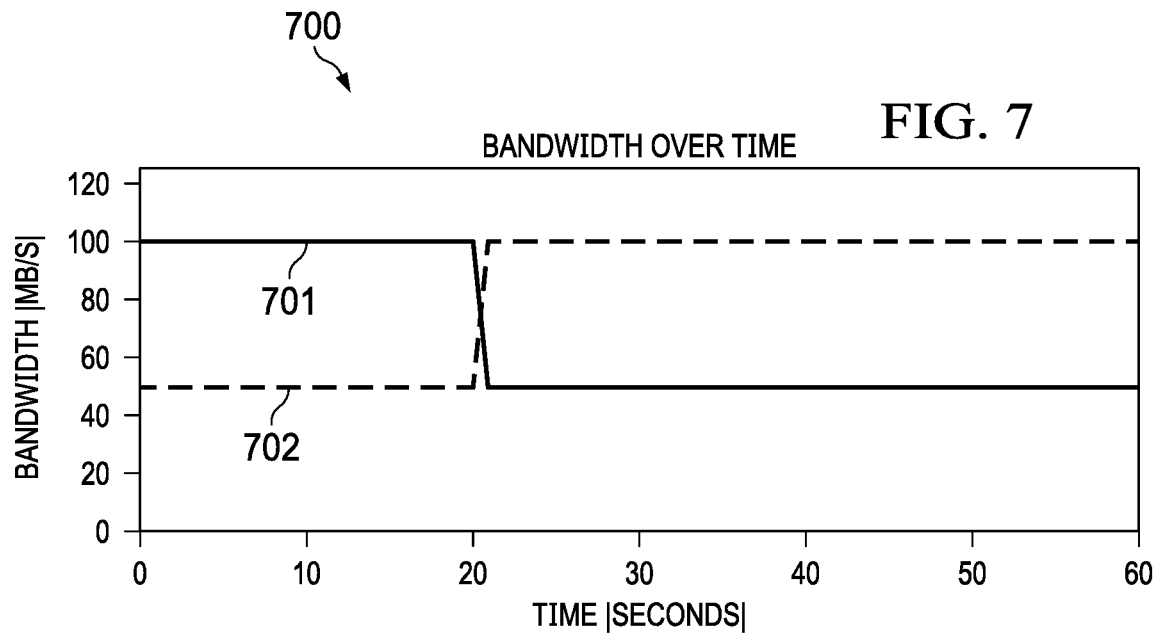
FIG. 7 is a graph showing bandwidth changes over time for a SLAM switching use-case, according to some embodiments.
Figure 8:
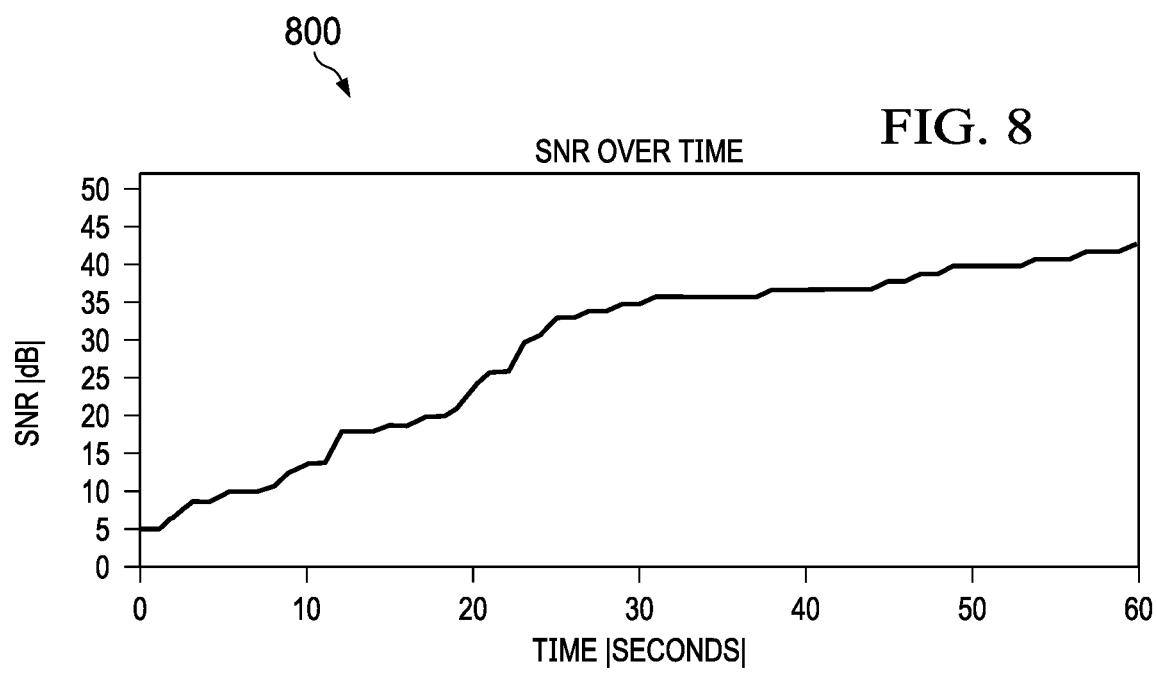
FIG. 8 is a graph showing Signal-to-Noise ratio (SNR) changes over time for the SLAM switching use-case, according to some embodiments.

FIG. 7 shows graph 700 of bandwidth changes over time, and FIG. 8 shows graph 800 of SNR changes over time, for the same SLAM switching use-case. In this use-case, curve 701 shows the execution bandwidth of SLAM method A, curve 702 shows the execution bandwidth of SLAM method B, and graph 800 shows the SNR of SLAM method B. Initially and while the SNR of SLAM method B is below a threshold (in this example, set to ~26 dB), method A is designated as primary or active and it is executed at full bandwidth (e.g., 100 MB/s). Method B is designated as secondary or non-active, and it is executed as a background process at a reduced bandwidth (e.g., 50 MB/s).

At time t~20 seconds, however, the instantaneous SNR of SLAM method B becomes greater than the threshold value. At this point, SLAM method B becomes a valid tracking source to switch into. If the accuracy of SLAM method B is greater than the accuracy of SLAM method A, as determined via graph 600, for instance, then method 500 may set SLAM method B as primary, which then begins to be executed at full bandwidth, and SLAM method A is set to secondary, as it continues to be executed with reduced bandwidth.

SLAM Scaling

Referring back to FIG. 1, most HMD manufacturers have minimum required host IHS 103 specifications (e.g., CPU, GPU, memory, etc.) for execution of an xR application, and SLAM has large compute and memory utilization needs. Even when a capable host IHS 103 is used, it may execute applications outside the xR process (or a particular portion of the xR process) that consume more IHS resources at different times.

To address these, and other issues, HMD 102 and/or host IHS 103 may be configured to scale SLAM processing down and/or up depending upon the load on host IHS 103, in addition or as an alternative to changing bandwidth (e.g., fps/resolution of sensors or camera 108), over-clocking, and/or compute thread management.

For example, HMD 102 of a scalable inside-out SLAM system may capture video frames (e.g., from camera 108), perform image pre-processing operations, generate object detection of landmarks found in a video frame using feature extraction techniques, and send landmark data (e.g., Regions of Interest (ROI) along with video frame data) to host IHS 103. Host IHS 103 may perform extended Kalman filtering (EKF) operations for each detected landmark and to calculate a Kalman Gain (G) for each landmark (L), which in turn indicates a confidence or probability of the landmark's measured location being accurate.

In some cases, the consumption of host hardware resources (e.g., CPU, GPU, memory, etc.) during operation of a SLAM method may be dependent upon the order or dimension of a square covariance matrix of landmark data (or other features extracted from sensor data). Particularly, host hardware resource utilization may be dominated by $O(M^2)$, where M is the number of landmarks detected: if M* is smaller than M, then host hardware utilization is reduced by $(M^2-M^{*2})/M^2 \times 100\%$. For example, if there are 100 landmarks detected (M=100), but only 50 landmarks are used (M=50), the reduction in utilization may be of 75%.

In various embodiments, scalable SLAM methods as described herein may be configured to reduce resource utilization on host IHS 103, at least in part, by: sorting or ranking detected landmarks by confidence, probability, or priority; generating a cutoff based upon a desired or expected amount of resource utilization reduction (e.g., compute load) using calibration data; and employing only a selected subset of all available landmarks (e.g., the M* highest-ranked of M landmarks to be used; M*<M) to generate covariance matrices to be used by the SLAM method thereafter.

Figure 9:
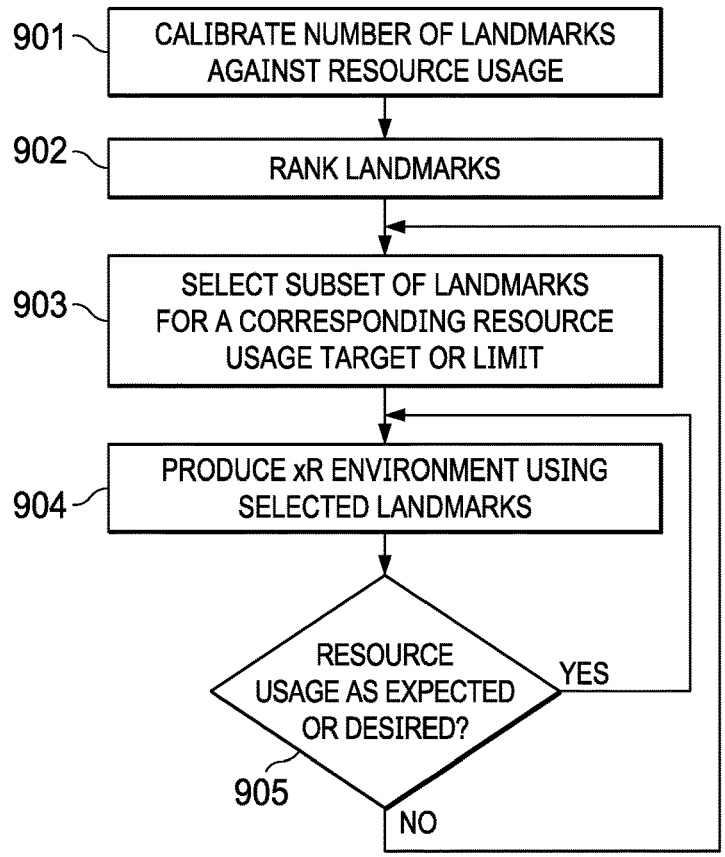
FIG. 9 is a flowchart of an example of a method for SLAM scaling, according to some embodiments.

FIG. 9 is a flowchart of an example of method 900 for SLAM scaling. In some embodiments, method 900 may be performed by a SLAM component or object of host IHS 103. Particularly, at block 901, method 900 calibrates a number of landmarks used against hardware resource usage during SLAM processing of those landmarks. Examples of host hardware resources which may have their utilization tested against varying number of landmarks include, but are not limited to, the host IHS's CPU, GPU, dedicated SLAM processor, or memory.

Figure 10:
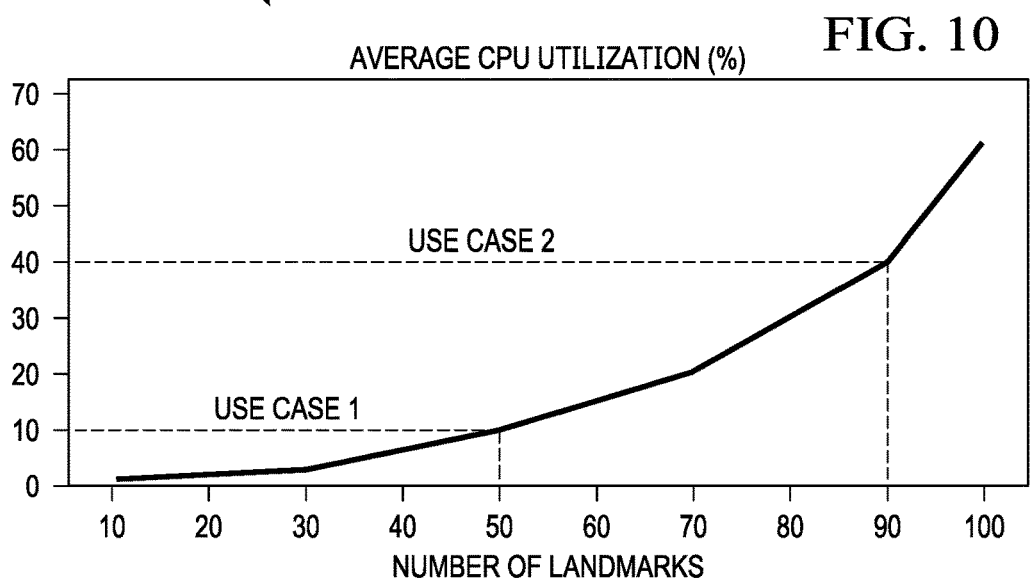
FIG. 10 is a graph showing a calibration curve for resource utilization against a number of landmarks, according to some embodiments.

As an example, graph 1000 of FIG. 10 illustrates a calibration curve for resource utilization against a number of landmarks. In to some embodiments, a calibration of number of landmarks versus average CPU load (or any other IHS hardware resource) may be performed for the space where the user is engaging in an AR experience, for example, and a calibration curve may be stored. The calibration curve provides a baseline for the space and the HMD-Host combination; but it should be noted that the process is specific to an HMD, the host IHS being used and the environment. Calibration may also be used to select an optimal number M of sorted landmarks to use in steady state as the maximum number of landmarks to compute.

In use-case 1, a user may set the maximum permitted CPU load for SLAM at 10%, which limits the number of landmarks (M) to 50. In use-case 2, however, if user does not set the maximum permitted CPU load for SLAM, a nominal maximum CPU load is chosen as 40% at driver install time on the host IHS, and the maximum number of landmarks is set to 90.

Back to FIG. 9, block 902 receives and ranks all detected landmarks detected by HMD 102, for example, using an extended Kalman filter (EKF). In block 902, EKF may be used to estimate the current state of a system based on a previous state, current observations, and estimated noise or error. A state is defined as a 1×N vector, where N is the number of measurements in a state. The primary relationship for an EKF defines a state transition as:

(New State)=(Old State)+$G$((Current Observation)−(Old State))

where $G$ is known as the Kalman Gain. The value of $G$ is based on average noise and/or measurement error over time, and it determines how much the current observation can be trusted.

The system state in an EKF for SLAM may be a 1×(6+3N) vector, where N is the number of landmarks. In that case, there may be 3 coordinates (e.g., x, y, z) for each landmark, and 6 coordinates (e.g., x, y, z, pitch, roll, yaw) for the user. Landmarks may be any static points in space that can be re-observed at a later state to determine how the system changed (a good landmark is easily identifiable and does not move, such as a wall, window, power outlet, etc.).

In various implementations, a matrix or table of size $(6+3N)^2$ stores the covariance between every pair of state measurements, and may be used when determining the Kalman Gain for a given landmark. The Kalman Gain may be used to determine how much to change every other state measurement based on the re-observed location of a single landmark: a higher Kalman Gain means that the landmark's new position may be trusted and used to update the system's state. Conversely, a Kalman Gain of zero means the position cannot be at all trusted and therefore the landmark should be ignored.

The use of EKF for a SLAM process by block 902 may be divided into 3 parts. The first part updates the current state from user movement. Motion may be described by the IMU data on the HMD, and the user's position and every known landmark's position may be estimated and updated. The second part uses re-observed landmarks via laser scanner or object recognition to update current state (both user position and landmark positions) more accurately than using IMU data, calculates G for the re-observed landmark, and updates the system accordingly. As noted above, G may be a 1×(6+3N) vector showing how much to update every state variable based on the landmark's new position. The third part adds newly-observed landmarks to the system's state. Adding new landmarks adds to the dimensionality of the system state and covariance matrix, such that the entire algorithm runs on the order of $O(N^2)$, where N is the number of landmarks.

Still with reference to FIG. 9, block 903 selects a subset of landmarks for a corresponding target hardware resource utilization. Block 904 produces an xR environment displayed by the HMD based on SLAM processing using only the selected subset of landmarks.

At block 905, if the resource utilization remains below a threshold value, control returns to block 904. Otherwise, if the resource utilization reaches the threshold value, an even smaller subset of landmarks may be selected at block 903, and the xR environment may be produced using the smaller subset. In some cases, however, if the resource utilization remains below the threshold value for a selected amount of time, the number of landmarks in the subset may be increased, for example, to improve the execution of the xR application using available processing power or memory on the host IHS.

Figure 11:
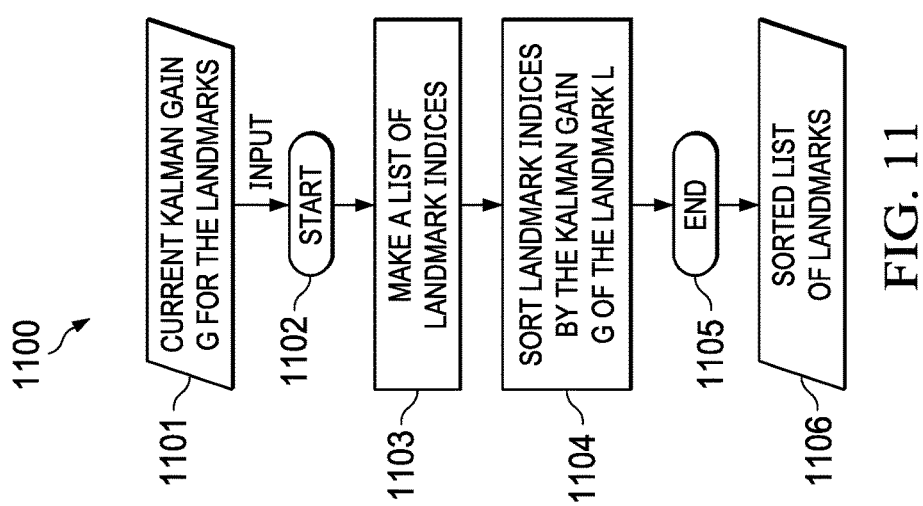
FIG. 11 is a flowchart of an example of a method for ranking landmarks, according to some embodiments.

FIG. 11 shows method 1100 for ranking landmarks. In some embodiments, method 1100 may be executed in connection with block 902 of FIG. 9. Method 1100 begins at block 1102 after receiving the current Kalman Gain (G) for all landmarks in block 1101. At block 1103, method 1100 may create a list of landmarks indices. At block 1104, method 1100 may sort the landmark indices by the Kalman Gain (G) of corresponding landmarks (L). After method 1100 ends a block 1105, it produces a ranked or sorted list of all detected landmarks.

Figure 12:
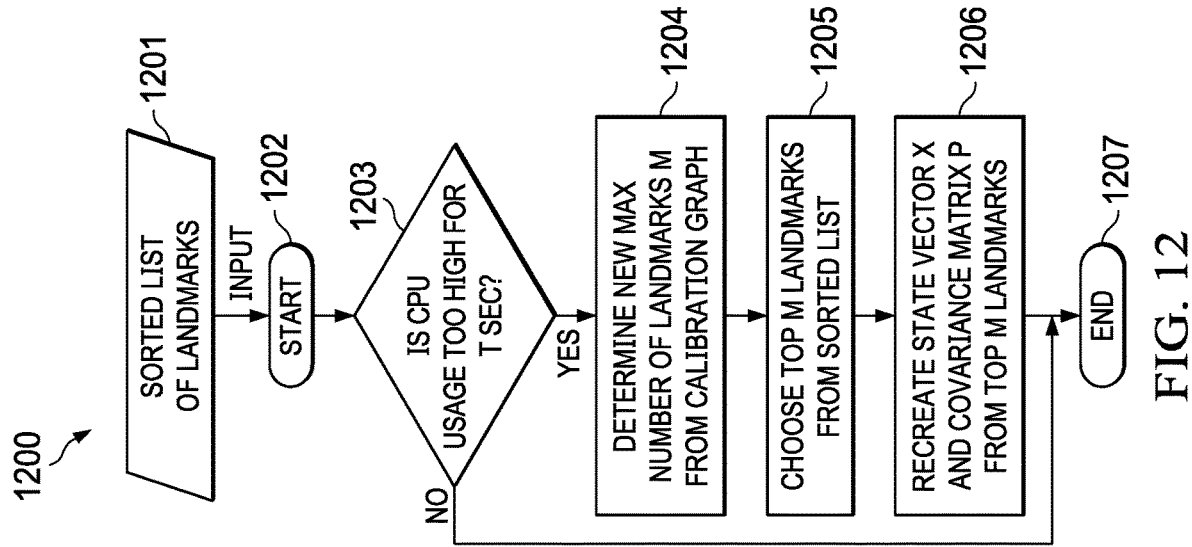
FIG. 12 is a flowchart of an example of a method for recalculating matrices based on a subset of landmarks, according to some embodiments.

FIG. 12 shows method 1200 for recalculating matrices based on a subset of landmarks. In some embodiments, method 1200 may be executed in connection with blocks 903-905 of FIG. 9. Method 1200 begins at block 1202 after receiving the sorted list of landmarks output by method 1100. At block 1203, method 1200 determines whether the host hardware resource (e.g., CPU utilization) is above a threshold value for a selected amount of time. If not, method 1200 ends at block 1207.

If block 1203 determines that the host hardware resource is above the threshold, block 1204 selects a new maximum number of landmarks to be used, for example, based upon calibration data (e.g., graph 1000). Particularly, block 1205 chooses the top M-ranked landmarks from the sorted list. Then, block 1206 recreates the state vector X and covariance matrix P using only the top M selected landmarks, before method 1200 ends at block 1207.

Figure 13:
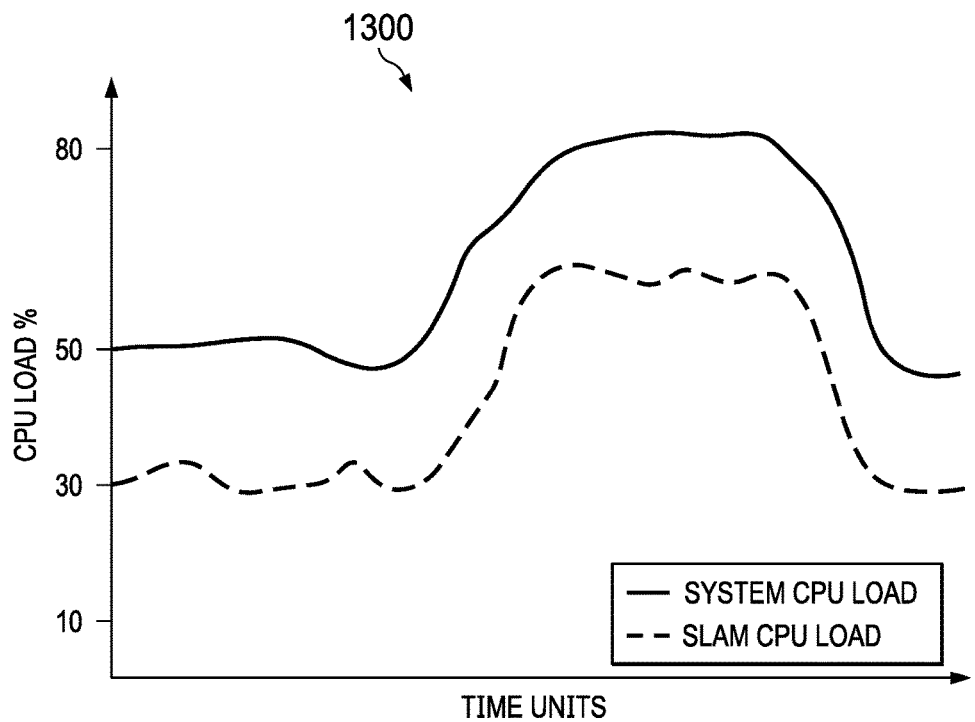
FIG. 13 is a graph showing changes in host CPU and SLAM CPU processing loads for a conventional SLAM use-case.
Figure 14:
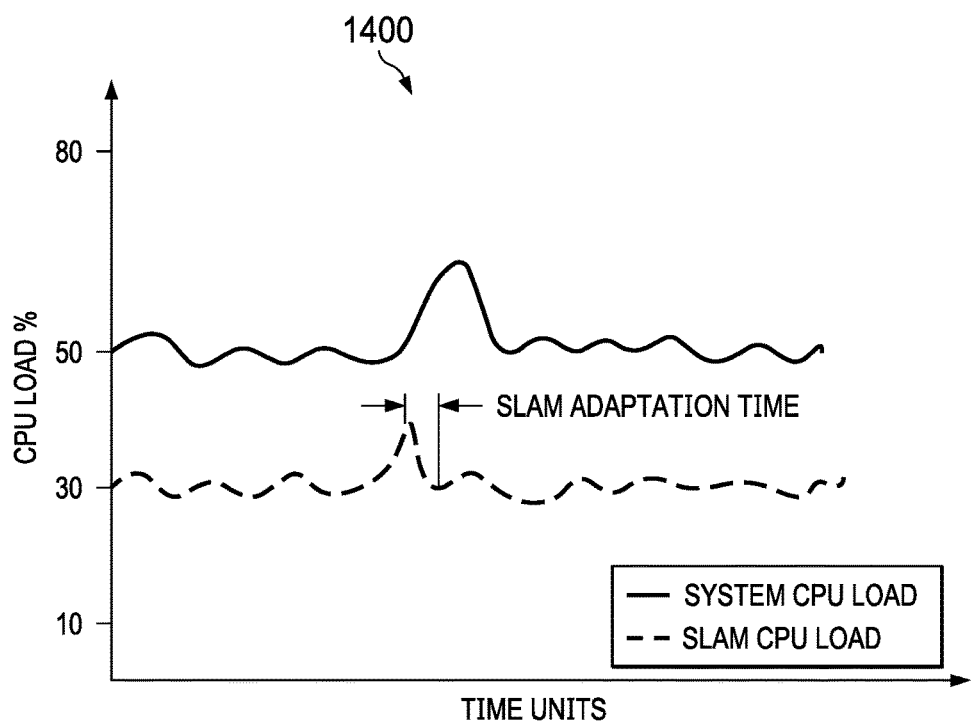
FIG. 14 is a graph showing changes in host CPU and SLAM CPU processing loads for a scaled SLAM use-case, according to some embodiments.

FIG. 13 shows graph 1300 of changes in host CPU and SLAM CPU processing loads for a conventional SLAM use-case, and FIG. 14 shows graph 1400 for a scaled SLAM use-case. Graph 1300 illustrates how the system CPU load varies as a function of SLAM CPU load in a conventional situation. In contrast, graph 1400 illustrates a "SLAM adaptation time" after which the number of landmarks is reduced to contain the hardware resource utilization of the system CPU. In some cases, the system CPU load and the SLAM CPU load may be executed by separate hardware processors; in other cases, these different loads may be executed by the same hardware processor and attributed to general or SLAM processes, respectively.

In some embodiments, when in steady state, if the host IHS resource is overloaded either due to another xR subsystem or an application outside xR taking up those resources, then there may be a determination of new M* (M*<M) number of landmarks to prioritize. The input to this determination may be, for example, a new target CPU load to be under for SLAM computations. The number of landmarks M* may be dynamically determined and continuously modulated/adapted in steady state, based on monitored resource usage. This reduced set of landmarks may then be fed downstream to rest of SLAM for use by the xR application.

Figure 15:
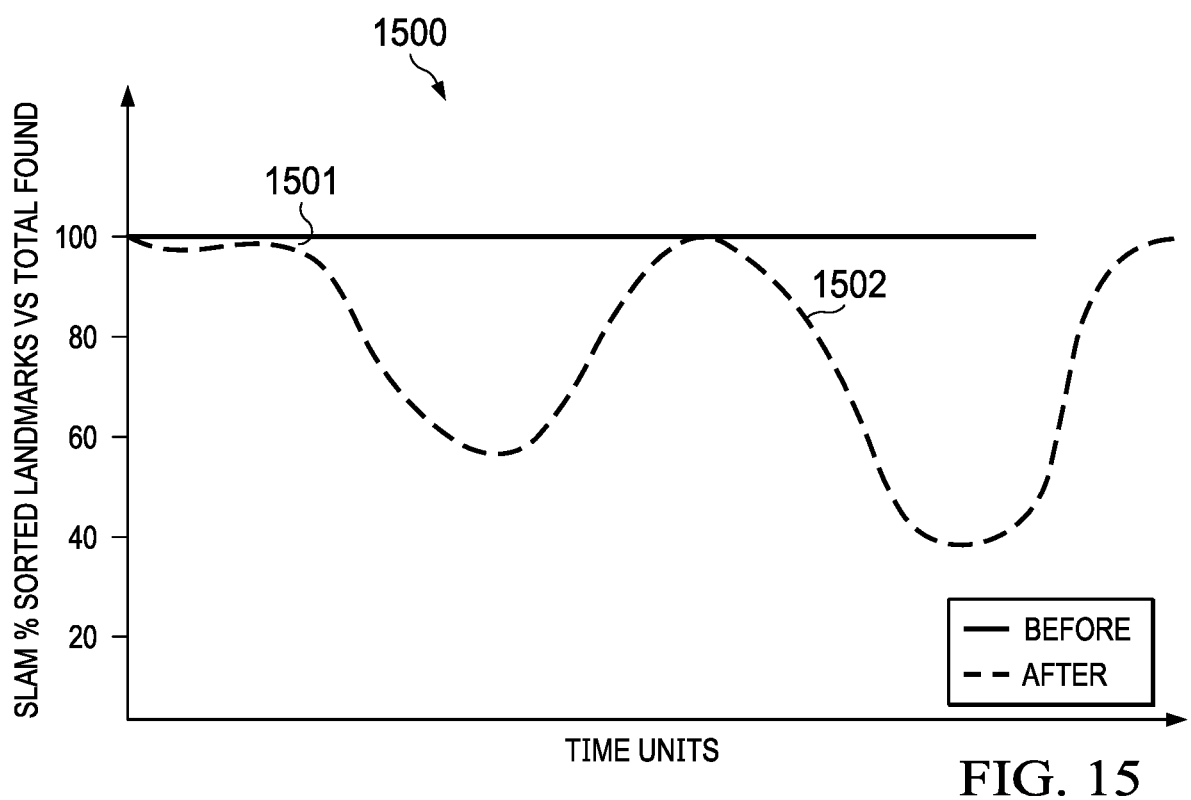
FIG. 15 is a graph showing a varying number of used landmarks against a changing CPU processing load for another scaled SLAM use-case, according to some embodiments.

Graph 1500 of FIG. 15 illustrates a varying number of used landmarks against a changing CPU processing load for another scaled SLAM use-case. In this example, the "before" curve shows the utilization of host CPU using all detected landmarks, all the time, regardless of CPU load. In contrast, the "after" curve shows a dynamic reduction in the number of user landmarks in response to event 1501, where another HMD subsystem takes up host CPU resources, followed by a progressive increase to the number of used landmarks. After event 1502, where the CPU is busy with Operating System (OS) updates, a smaller subset of landmarks is progressively selected, before the CPU is freed up (e.g., update is complete), and there is another increase in the number of used landmarks.

Figure 5:
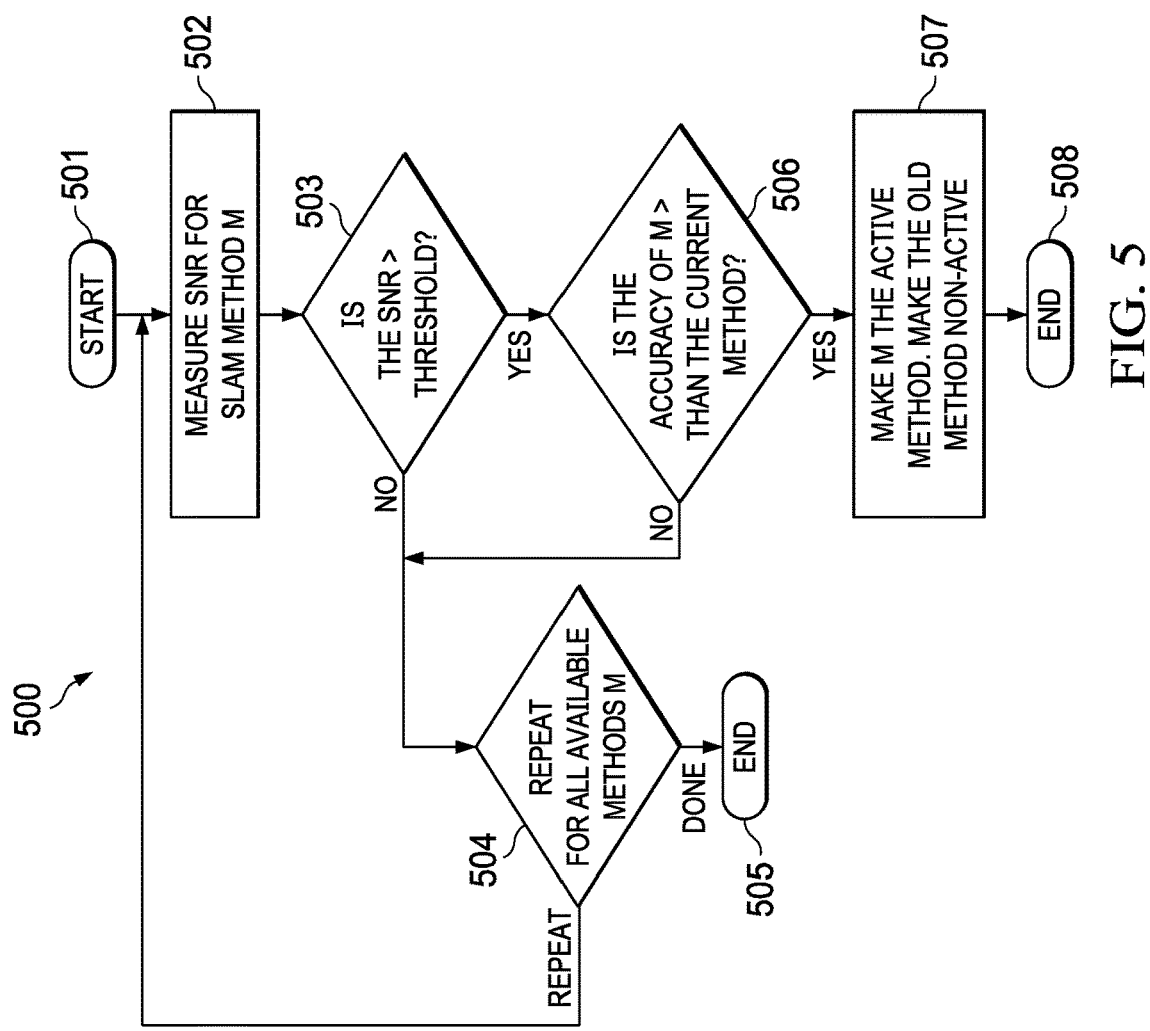
FIG. 5 is a flowchart of an example of a method for selecting a primary and a secondary SLAM system, according to some embodiments.

In some embodiments, a reduction in the number of used landmarks in an inside-out SLAM method, as caused by execution of method 1200 of FIG. 12, for example, may trigger a responsive switch to a different type of SLAM method (e.g., one that uses a more accurate positional tracking system) by operation of method 500 of FIG. 5, at least until the CPU's utilization is reduced; at which point method 500 may re-select the inside-out SLAM method but now with an increased number of landmarks.

In various embodiments, systems and methods described herein may control HMD SLAM without degrading user experience, in a manner superior to overclocking or CPU/GPU thread management on the host IHS. In some cases, systems and methods described herein may leverage existing HMD SLAM processing and HMD SLAM cameras without significant changes, by modifying only the host IHS SLAM processing. These systems and methods may require no modification to an xR rendering application, and may scale to enable SLAM processing on lower-end host IHSs.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a host processor; and
a memory coupled to the host processor, the memory having program instructions stored thereon that, upon execution, cause the IHS to:
select a subset of landmarks comprising fewer than all landmarks detected in a physical environment;
manage utilization of an IHS resource during execution of a virtual, augmented, or mixed reality application using the subset of landmarks to the exclusion of other landmarks; and
at least one of:
(a) identify an increase in the utilization of the IHS resource and reduce the number of landmarks in the subset of landmarks to avoid reaching a maximum IHS resource utilization level; or
(b) identify a decrease in the utilization of the IHS resource and increase the number of landmarks in the subset of landmarks without reaching the maximum IHS resource utilization level.

2. The IHS of claim 1, wherein to select the subset of landmarks, the program instructions, upon execution, further cause the IHS to rank a plurality of landmarks using a confidence level associated with each landmark.

3. The IHS of claim 2, wherein the program instructions, upon execution, further cause the IHS to calculate the confidence level of each landmark using a Kalman filter.

4. The IHS of claim 3, wherein the subset of landmarks comprises a number of landmarks selected to maintain the utilization of the IHS resource below a predetermined amount.

5. The IHS of claim 4, wherein the number of landmarks is selected based upon a calibration curve that associates a change in number of used landmarks with a corresponding change in utilization of the IHS resource.

6. The IHS of claim 1, wherein the IHS resource comprises the host processor.

7. The IHS of claim 1, wherein the IHS resource comprises the memory.

8. The IHS of claim 1, wherein the landmarks are detected via a Head-Mounted Device (HMD) in communications with the IHS.

9. The IHS of claim 8, wherein the subset of landmarks is usable during execution of the virtual, augmented, or mixed reality application to locate the HMD in the physical environment.

10. A method, comprising:
selecting a subset of landmarks usable by a Simultaneous Localization and Mapping (SLAM) system to locate a Head-Mounted Device (HMD) in a physical environment, wherein subset of landmarks includes a number of landmarks fewer than all detected landmarks;
controlling utilization of a hardware resource by changing the number of landmarks in the subset; and
at least one of:
 (a) identifying an increase in the utilization of the hardware processor and reducing the number of landmarks in the subset of landmarks; or
 (b) identifying a decrease in the utilization of the hardware processor and increasing the number of landmarks in the subset of landmarks.

11. The method of claim 10, further comprising ranking the detected landmarks using a confidence level associated with each landmark.

12. The method of claim 10, wherein the number of landmarks is selected based upon a calibration curve that associates a change in number of landmarks with a corresponding change in utilization of the IHS resource.

13. A hardware memory device having program instructions stored thereon that, upon execution by a hardware processor, cause the hardware processor to:
select a subset of landmarks usable to locate a Head-Mounted Device (HMD) in space, wherein the subset of landmarks comprises fewer than a total number of landmarks available;
control utilization of the hardware processor by dynamically changing a number of landmarks in the subset during execution of a virtual, augmented, or mixed reality applications; and
at least one of:
 (a) identify an increase in the utilization of the hardware processor and reduce the number of landmarks in the subset of landmarks; or
 (b) identify a decrease in the utilization of the hardware processor and increase the number of landmarks in the subset of landmarks.

14. The hardware memory device of claim 13, wherein to select the subset of landmarks, the program instructions, upon execution, further cause the hardware processor to rank each of the landmarks detected by the HMD using a confidence level associated with each landmark.

* * * * *